(12) United States Patent
Ueno et al.

(10) Patent No.: US 6,226,670 B1
(45) Date of Patent: *May 1, 2001

(54) E-MAIL DISTRIBUTION SYSTEM

(75) Inventors: Hideo Ueno; Yoshimi Tsumori, both of Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,741

(22) Filed: Jun. 15, 1998

(30) Foreign Application Priority Data

Mar. 9, 1998 (JP) .................................. 10-057110

(51) Int. Cl.[7] ...................................... G06F 13/00
(52) U.S. Cl. .......................... 709/207; 709/206; 709/207; 709/201; 709/238; 709/240; 340/825.52; 340/825.54
(58) Field of Search ..................... 709/206, 201, 709/207, 238, 240; 340/825.52, 825.54

(56) References Cited

U.S. PATENT DOCUMENTS

| | | | |
|---|---|---|---|
| 5,675,507 | * | 10/1997 | Bobo, II . |
| 5,826,258 | * | 10/1998 | Gupta et al. . |
| 5,835,762 | * | 11/1998 | Gans et al. ............................ 395/670 |
| 5,864,673 | * | 1/1999 | Ohto et al. ....................... 395/200.49 |
| 5,892,909 | * | 4/1999 | Grasso et al. .................... 395/200.31 |
| 5,918,158 | * | 6/1999 | LaPorta et al. ...................... 455/31.3 |
| 5,918,237 | * | 6/1999 | Montalbano . |
| 5,933,478 | * | 8/1999 | Ozaki et al. ....................... 379/93.24 |
| 6,058,482 | * | 5/2000 | Liu . |
| 9,959,543 | * | 9/1999 | LaPorta et al. ................. 340/825.44 |

FOREIGN PATENT DOCUMENTS

| | | |
|---|---|---|
| 6268676 | 9/1994 | (JP) . |
| 9069854 | 3/1997 | (JP) . |

* cited by examiner

Primary Examiner—Robert B. Harrell
Assistant Examiner—S. Willett
(74) Attorney, Agent, or Firm—Helfgott & Karas, P.C.

(57) ABSTRACT

An E-mail distributing system which is composed of a server and a client including a user, and distributes an E-mail corresponding to a group including a plurality of clients.

The client transmits a mail acquisition demand including a group identifier, and the server includes personal mail spools and group mail spools. The received E-mails are accumulated in the mail spools according to an arrival address. When a mail acquisition demand from the client includes the group identifier, the E-mail with top priority corresponding to the group identifier is extracted from the group mail spools and is then distributed to the client.

14 Claims, 16 Drawing Sheets

| USER IDENTIFIER UID | PASSWARD PW | GROUP IDENTIFIER GID | KEY WORD KW |
|---|---|---|---|

FIG.11

| QUESTION TYPE | PRIORITY LEVEL |
|---|---|
| SERVICE | 0 |
| OPERATION | 1 |
| CONSTRUCTION | 2 |
| FAULT | 3 |

FIG.12

| ADDRESS OF SENDER | PRIORITY LEVEL |
|---|---|
| abc@def.co.jp | 2 |
| ghi@jkl.co.jp | 3 |
| mno@pqr.co.jp | 1 |
|  |  |
| stu@vwx.co.jp | 2 |

FIG.13

| ELAPSED TIME (S) | PRIORITY LEVEL |
|---|---|
| 0~59 | 0 |
| 60~179 | 1 |
| 180~599 | 2 |
| 600~2999 | 3 |
| 3000~ | 4 |

QUESTIONER:TARO KYUSHU
TELEPHONE NUMBER : 092-852-3175
MAIL ADDRESS : qcs@fujitsu.co.jp
QUESTION TYPE : FAULT
PRODUCT : Wing Filer
TITLE : FAULT OF Wing Filer
CONTENTS OF QUESTION : CLIENT PC FAULTED DURING LOCK OF DOCUMENT IN Wing Filer. WHAT HAPPENS WITH LOCK?

E-MAIL DISTRIBUTION SYSTEM

BACKGROUND OF THE INVENTION

1. Field of the Invention

The present invention relates to an E-mail distribution system, and in particular to an E-mail distribution system which is formed of a sever and a client (equipment) including a user, and distributes an E-mail corresponding to a group which includes a plurality of clients.

In recent years, E-mails have been popular more and more. A general arrangement of a system for distributing such E-mails is shown in FIG. 17. A network 20 is connected to a server 21 and a plurality of clients 22 each of which includes a user. Some of such clients 22 are aggregated to compose groups G1, G2 as shown in FIG. 17.

An actual example of such a system is shown in FIG. 18. A primary responder P2 accepts a question $\hat{1}$ from a questioner P1 on the telephone. Then, the primary responder P2 sends the contents of the question to an answerer group P3 through an E-mail $\hat{2}$. This is accumulated in the mail server 21 as a question mail transmission $\hat{2}$.

The answerer group P3 is an aggregation of a plurality of clients each including a user in the form of hardware. When an operator of the answerer group P3 sends a mail acquisition demand $\hat{3}$ to the mail server 21, the mail server 21 executes the mail distribution $\hat{4}$ to the answerer group P3. An answerer of the answerer group P3 investigates the contents of the E-mail and returns an answer $\hat{5}$ on the telephone, resulting in a help-desk operation.

Thus, in a recent E-mail distribution system, not only a single client but also a plurality of clients forming a group are provided to have a connection with a server. Accordingly, the distribution of E-mails received as a group E-mail address to client users has been required.

2. Description of the Related Art

The prior art E-mail distribution system in which clients 22 form a group for the connection to a server 21 is shown in FIGS. 19 and 20. Specifically, FIG. 19 shows an arrangement of the server 21, and FIG. 20 shows an arrangement of each of the clients 22.

The server 21 shown in FIG. 19 is formed of an interface 1 which receives an E-mail EM1 from a network, a mail receptor 2 which accepts the E-mail through the interface 1, a mail accumulator 3 which accumulates the E-mail accepted at the mail receptor 2 and which includes a plurality of personal mail spools 4, a mail acquisition demand receptor 6 which accepts a mail acquisition demand MD1 from a client 22 through the interface 1, and a mail distribution controller 9 which outputs an E-mail EM2 taken from the mail accumulator 3 by the mail acquisition demand receptor 6 through the interface 1.

The client 22 shown in FIG. 20 is formed of a mail acquisition demander 11 which sends the mail acquisition demand MD1 to the server 21 through an interface 10 and a mail receiver 12 which receives the E-mail EM2 through the interface 10.

A format example of the above-mentioned mail acquisition demand MD1 is shown in FIG. 21. This demand MD1 is formed of a user identifier UID and a password PW.

In such a prior art E-mail distribution system, the methods of distributing E-mails received with a group E-mail address to the user of the client 22 are shown in FIGS. 22 and 23.

FIG. 22 shows a broadcasting distribution method. When E-mails a, b, c, which correspond to E-mails EM1, EM2 of FIG. 19, are sent to the server 21, the mail receptor 2 in the server 21 accepts them through the interface 1. These E-mails a–c are stored in all of the personal mail spools 4-1–4-3 of the users registered in an E-mail address corresponding to a group GMA.

When the mail acquisition demand MD1 is transmitted from the client 22 to the server 21, the mail acquisition demand receptor 6 specifies a user based on a user identifier UID and a password PW that are included in the mail acquisition demand MD1. The receptor 6 extracts the E-mails a–c from the personal mail spools 4-1–4-3 corresponding to the user and distributes them to the clients 22-1–22-3 through the mail distribution controller 9.

Thus, when an E-mail addressed to a group E-mail address is received, the E-mail is distributed by a broadcasting method to all of the users which belong to the group corresponding to the address.

FIG. 23 shows a transferring distribution method. In this case, when such E-mails a–c are sent to the server 21, the mail receptor 1 accepts them through the interface 1. These E-mails a–c are stored in one of the personal mail spools 4-1–4-3 of the users registered in a group E-mail address GMA.

When the clients 22-1–22-3 transmit the mail acquisition demand MD1 to the server 21, the mail acquisition demand receptor 6 specifies a user based on a user identifier UID and a password PW included in the mail acquisition demand MD1. The receptor 6 extracts the E-mails a–c from the personal mail spools 4-1–4-3 corresponding to the user, and distributes them to the clients 22-1–22-3 through the mail distribution controller 9. Thus, this transferring distribution method is executed by distributing an E-mail to any user of a group.

Such a prior art E-mail distribution system as above-mentioned encounters the following problems when a question is received with an E-mail of a group E-mail address and one user of the group answers the question:

When an E-mail of a group E-mail address is accumulated in the personal mail spools corresponding to all of the users of the group by the broadcasting distribution method shown in FIG. 22, the E-mail is distributed to all of the users, although only one of the users of the group has to deal with the E-mail.

When an E-mail is accumulated in the personal mail spool corresponding to any of the users of the group by the transferring distribution method shown in FIG. 23, one of the users of the group is to deal with the E-mail. However, the accumulation is executed in the personal mail spool (accumulator) regardless of the situation of the user. Therefore, while the user is leaving his seat, the E-mail is to be accumulated in the personal mail spool so that the response to the question will be delayed.

Thus, it has been impossible to distribute E-mails transmitted with a group E-mail address to only one user of the group with the most suitable priority.

SUMMARY OF THE INVENTION

It is accordingly an object of the present invention to provide an E-mail distributing system which is composed of a server and a client including a user and distributes an E-mail corresponding to a group including a plurality of clients, in which E-mails transmitted with a group E-mail address are distributed to only one client/user of the group with the most suitable priority.

For the achievement of the above-mentioned object, in an E-mail distributing system according to the present invention, the client comprises a mail acquisition demander which transmits a mail acquisition demand including a group identifier, and the server comprises a mail accumulator which includes personal mail spools and group mail spools, a mail receptor which accumulates a received E-mail in the mail spools corresponding to an arrival address, and a mail acquisition demand receptor which extracts the group identifier included in the mail acquisition demand received from the client, a priority mail extractor which extracts an E-mail with top priority from the group mail spools corresponding to the group identifier, and a mail distribution controller which distributes the extracted E-mail to the client.

In the present invention, the server may further comprise a candidate mail extractor, and when the mail acquisition demander inserts a key word into the mail acquisition demand the mail acquisition demander extracts the group identifier and the key word and the candidate mail extractor retrieves an E-mail accumulated in the group mail spools corresponding to the group identifier based on the extracted key word and extracts the retrieved E-mail as a candidate mail, and the priority mail extractor can extract an E-mail with top priority based on the contents of each E-mail from the candidate E-mails.

The mail receptor may accumulate the received E-mail in the group mail spools corresponding to the group mail address.

In addition, the mail receptor may accumulate the received E-mail in all of the personal mail spool associated with the group mail address corresponding to the arrival address.

Also, the mail receptor may accumulate the received E-mail in one of the personal mail spools associated with the group mail address corresponding to the arrival address.

Furthermore, when the arrival address is a personal mail address the mail receptor may accumulate the E-mail in the personal mail spool corresponding to the personal mail address.

Furthermore, the priority mail extractor may determine a priority in consideration of an emergency degree of the contents of the E-mail, sender address, and an elapsed time after the E-mail has been accumulated in the mail spool.

The above-mentioned emergency degree of the contents of the E-mail may be a question type.

Also, the mail acquisition demander may execute a log-in process with a user identifier and a password included in the mail acquisition demand from the client.

In addition, the mail acquisition demand receptor may extract an E-mail from the personal mail spools corresponding to the user identifier when the mail acquisition demand from the client does not contain the group identifier.

The above-mentioned system will now be described along with the operation of an E-mail distribution system according to the present invention schematically shown in FIG. 1.

First of all, this E-mail distribution system is formed of a server and a client, and assigns an E-mail address corresponding to a group which is an aggregation of a plurality of users, in the same manner as the abovementioned prior art.

When E-mails a–c are sent from the network (not shown) to the server, the mail receptor accepts the E-mails. If their arrival addresses are a group E-mail address GMA, the E-mails a–c are accumulated in the group mail spools 5 as shown. Then, the mail acquisition demand which includes a group identifier (and a key word if necessary) is transmitted from the clients 22-1–22-3 to the server.

After the server has received the mail acquisition demand, the mail acquisition demand receptor analyses the mail acquisition demand. When the group identifier and a key word are set in the mail acquisition demand, the candidate mail extractor extracts an E-mail including contents which are consistent with the key word from the group mail spools 5 as a candidate mail. In addition, the priority mail extractor analyses the extracted candidate mails in respect of information such as an emergency degree and a sender address and of an elapsed time after the E-mails have been accumulated, and extracts an E-mail to be processed with top priority.

Moreover, when only the group identifier is set therein, the priority mail extractor analyses the contents of the E-mails and extracts an E-mail to be processed with top priority from the group mail spools 5. The mail distribution controller transmits the extracted E-mails a, b, c to the clients 22-3, 22-1, 22-2, respectively in FIG. 1, which are received by the mail receiver in each client.

Thus, it becomes possible to distribute E-mails transmitted with a group E-mail address to only one client (user) within a group.

BRIEF DESCRIPTION OF THE DRAWINGS

FIG. 11 is a chart showing priority level data, corresponding to a question type, used in a priority mail extractor in an E-mail distribution system according to the present invention;

FIG. 12 is a chart showing priority level data, corresponding to a sender address, used in a priority mail extractor in an E-mail distribution system according to the present invention;

FIG. 13 is a chart showing priority level data, corresponding to an elapsed time, used in a priority mail extractor in an E-mail distribution system according to the present invention;

Throughout the figures, like reference numerals indicate like or corresponding components.

DESCRIPTION OF THE EMBODIMENTS

Figure 1:
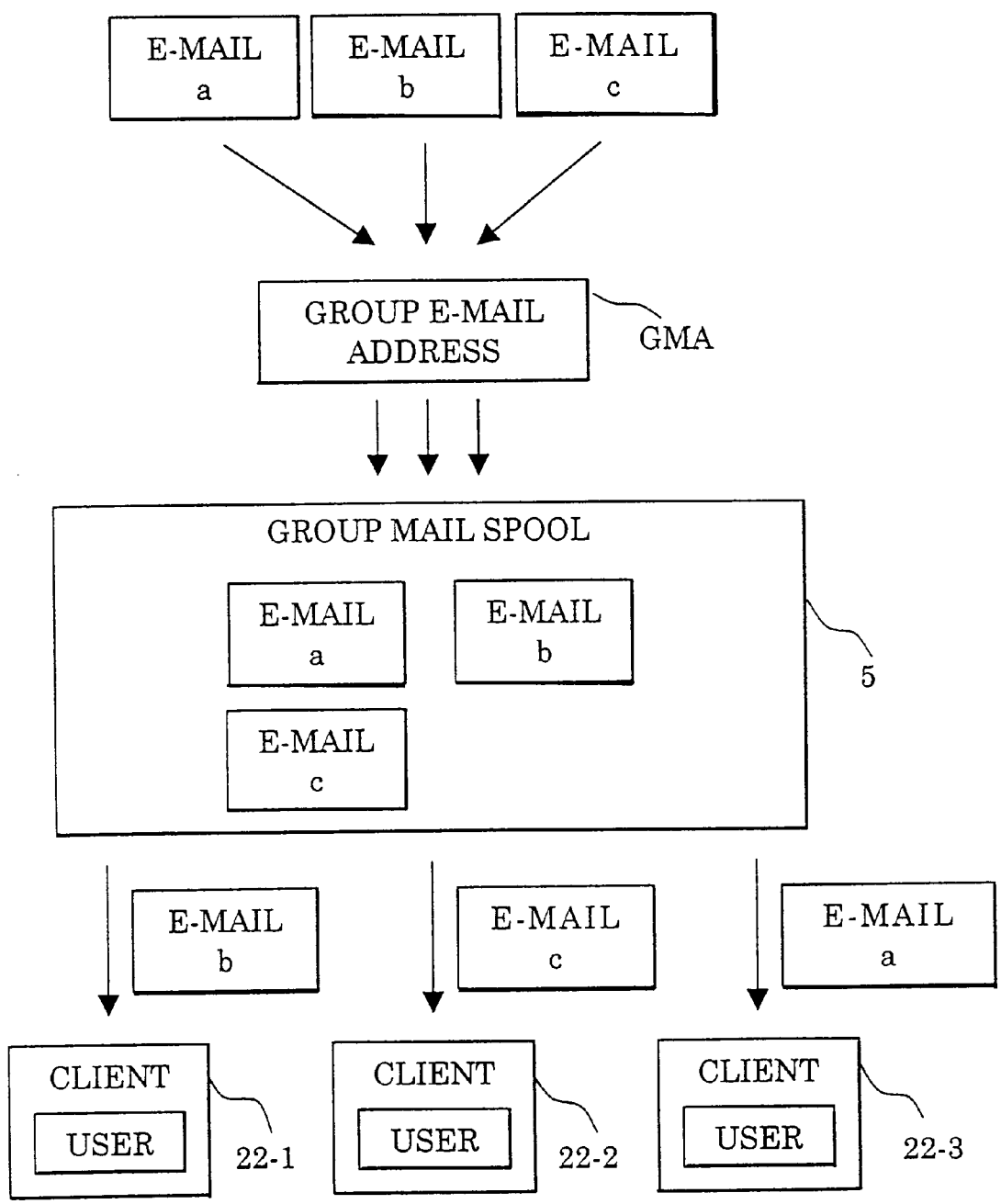
FIG. 1 is a block diagram showing an operation concept of an E-mail distribution system according to the present invention.
Figure 2:
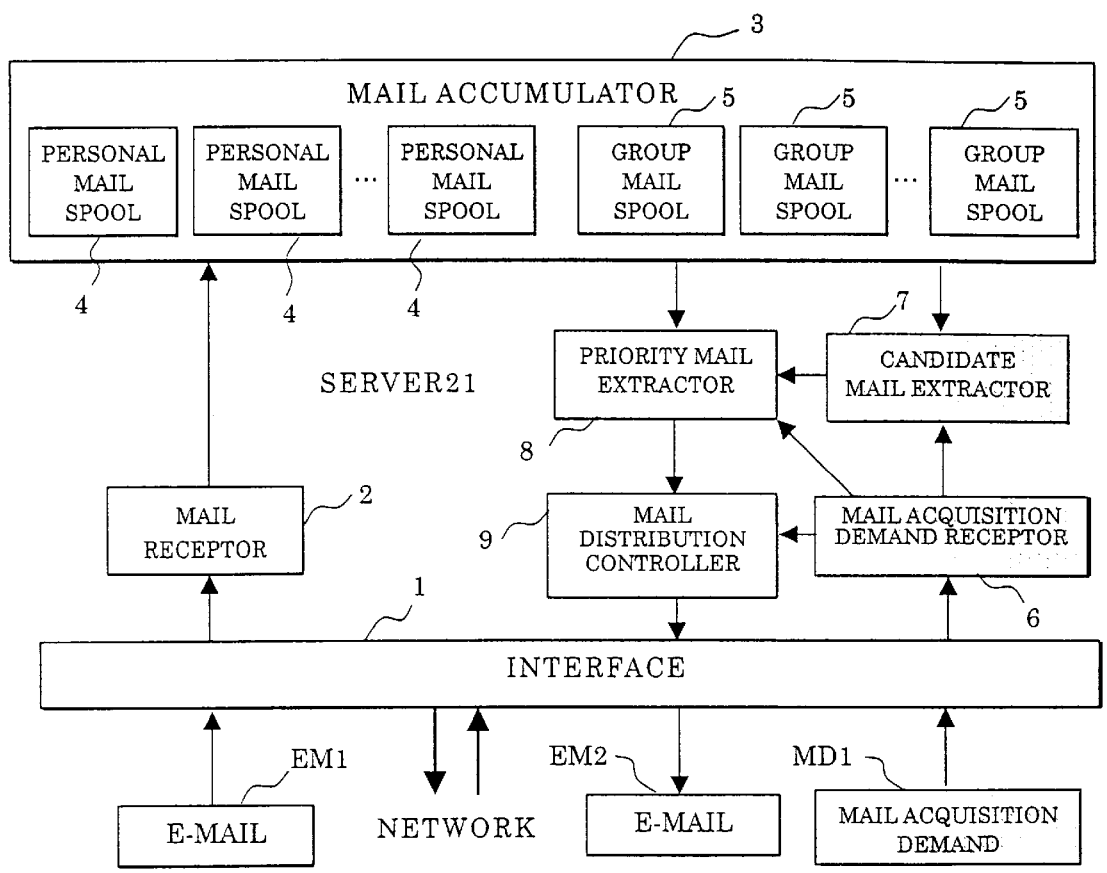
FIG. 2 is a block diagram showing a system arrangement of a server in an E-mail distribution system according to the present invention.
Figures 3, 4:
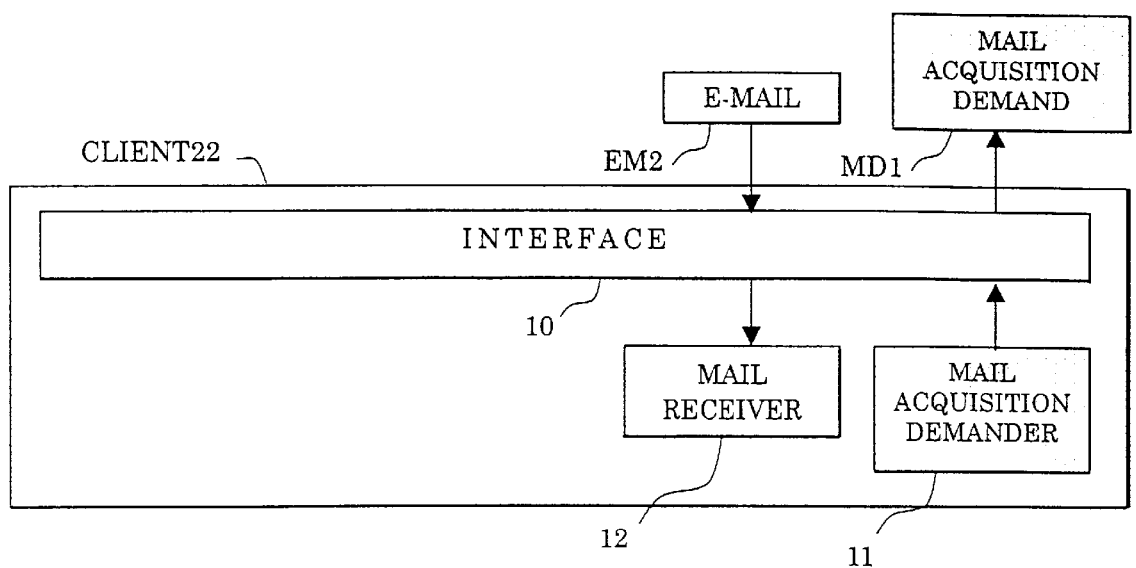
FIG. 3 is a block diagram showing a system arrangement of a client in an E-mail distribution system according to the present invention.
FIG. 4 is a block diagram showing a format example of a mail acquisition demand used in an E-mail distribution system according to the present invention.

FIG. 2 shows an arrangement of a server 20 and FIG. 3 shows an arrangement of a client 22 in an E-mail distribution system according to the present invention.

In the server 20 shown in FIG. 2, data transmission-reception between the network and the server 20 is executed at an interface 1. A mail receptor 2 receives an E-mail EM1 and distributes it to a plurality of mail spools in a mail accumulator 3 which accumulates E-mails corresponding to arrival addresses.

This mail accumulator 3 includes personal mail spools 4 which accumulate E-mails of the individual mail addresses, respectively and group mail spools 5 which accumulate E-mails of the group E-mail addresses.

In the client 22 shown in FIG. 3, an interface 10 executes data transmission-reception with the server 21. A mail acquisition demander 11 transmits a mail acquisition demand MD1 which includes a user identifier UID, a password PW, a group identifier GID and a key word KW illustrated in FIG. 4 from the interface 10 to the server 21. A mail receiver 12 receives an E-mail EM2 distributed from the server 21 through the interface 10

A mail acquisition demand receptor 6 accepts the mail acquisition demand MD1 from the client 20 through the interface 1. A candidate mail extractor 7 extracts an E-mail the contents of which correspond to the key word KW when the key word KW is included in the mail acquisition demand MD1 from a mail accumulator 3. A priority mail extractor 8 extracts an E-mail which should be dealt with with top priority from the mail accumulator 3 by analyzing information such as emergency degree included in the contents of the E-mail and a sender address as well as an elapsed time after the E-mail was accumulated. A mail distribution controller 9 distributes these extracted E-mails EM2 to the clients 22.

The operation of the E-mail distribution system according to the present invention will now be described for each component referring to FIG. 5–16.

Figure 5:
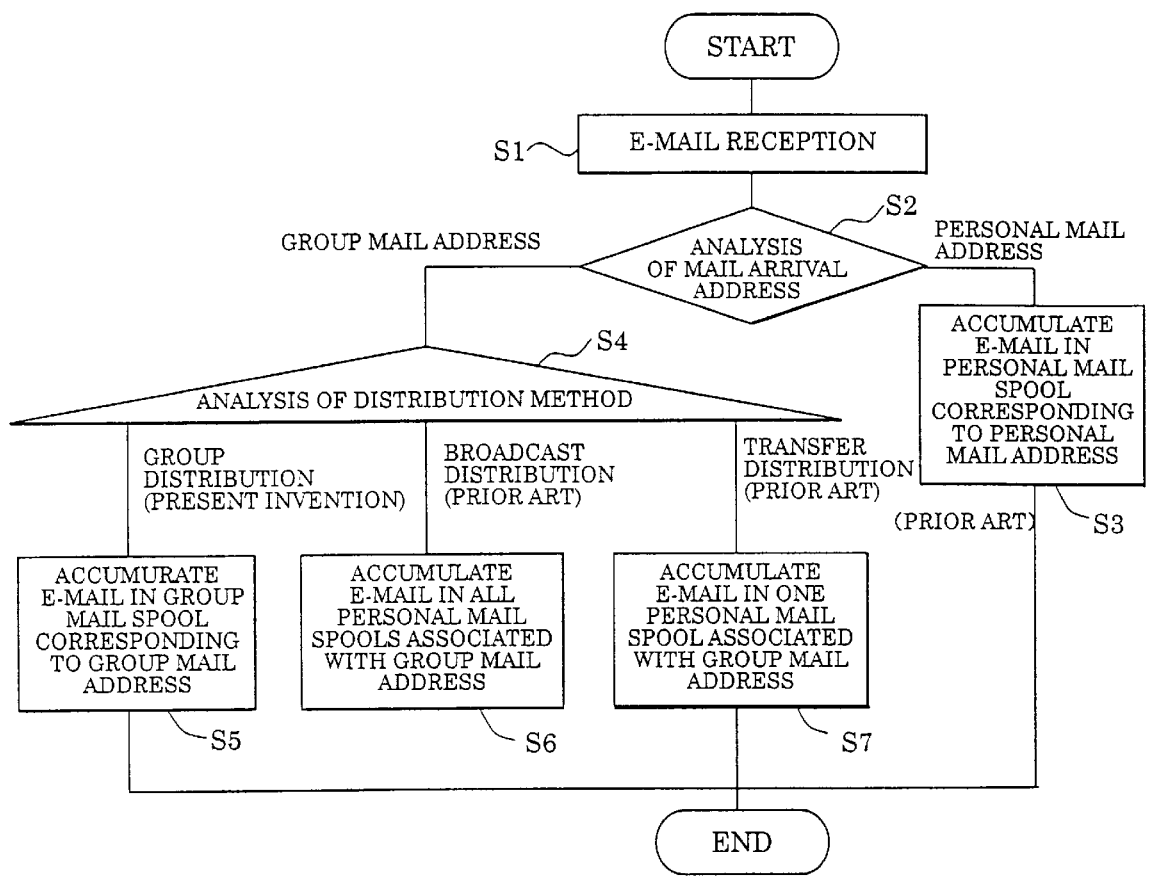
FIG. 5 is a flow chart showing an operation procedure of a mail receptor used in a server in an E-mail distribution system according to the present invention.

Operation of the Mail Receptor 2 (see FIG. 5)

Figures 15, 16:
FIG. 15 is a diagram showing an input format example of a question mail used in an E-mail distribution system according to the present invention.
FIG. 16 is a diagram showing an executed example of a question mail used in an E-mail distribution system according to the present invention.
Figure 17:
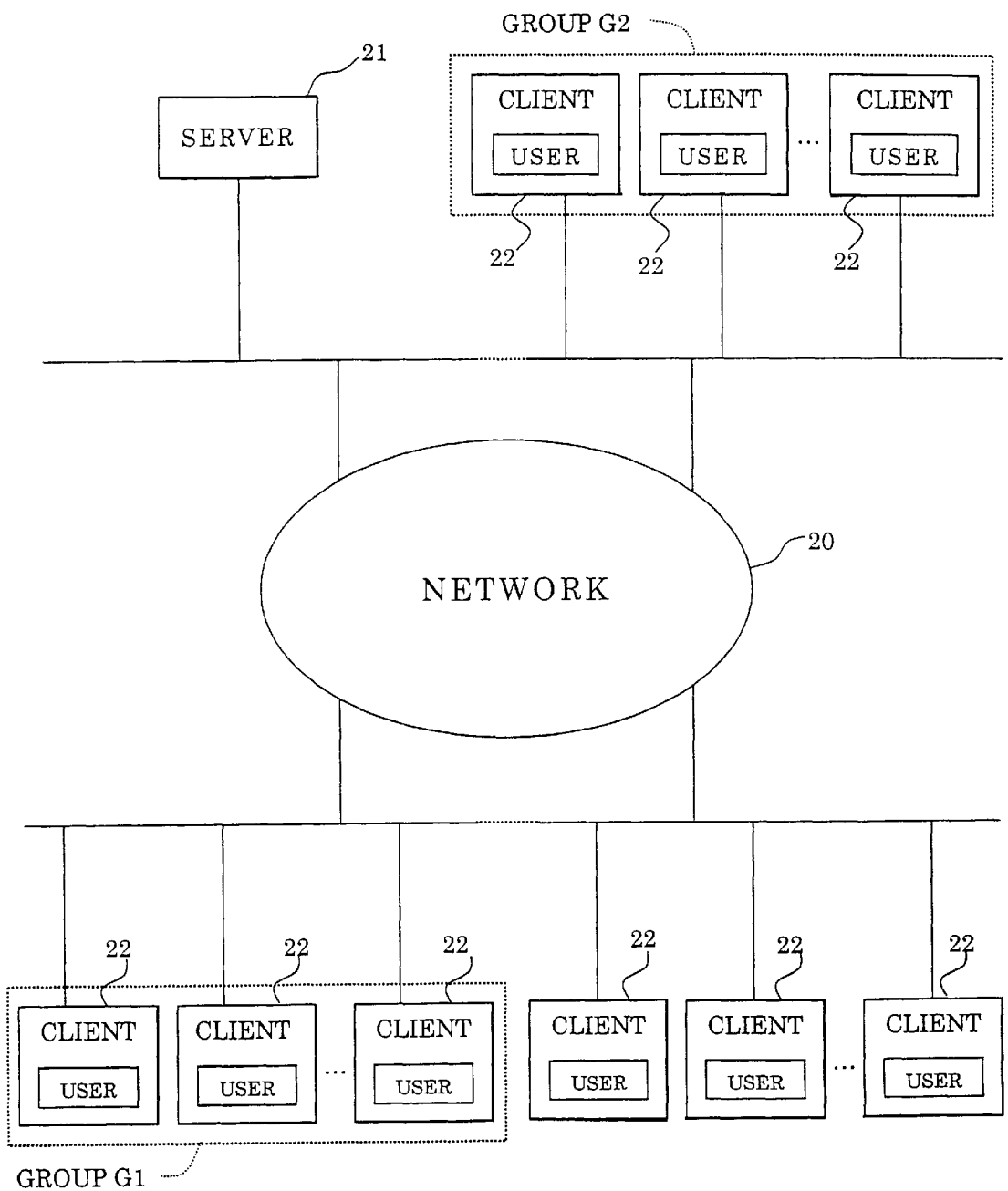
FIG. 17 is a block diagram showing a schematic system arrangement of a conventional E-mail distribution system.
Figure 18:
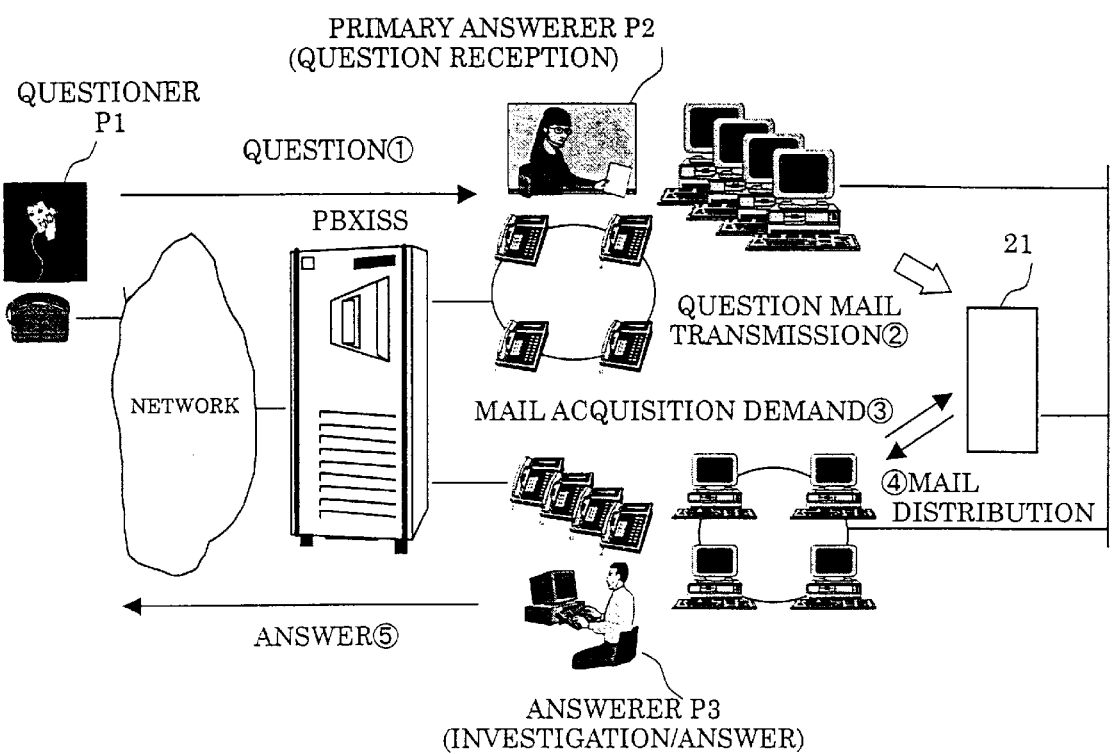
FIG. 18 is a schematic diagram showing an actual arrangement when a general E-mail distribution system is used in a so-called helpdesk operation.
Figure 19:
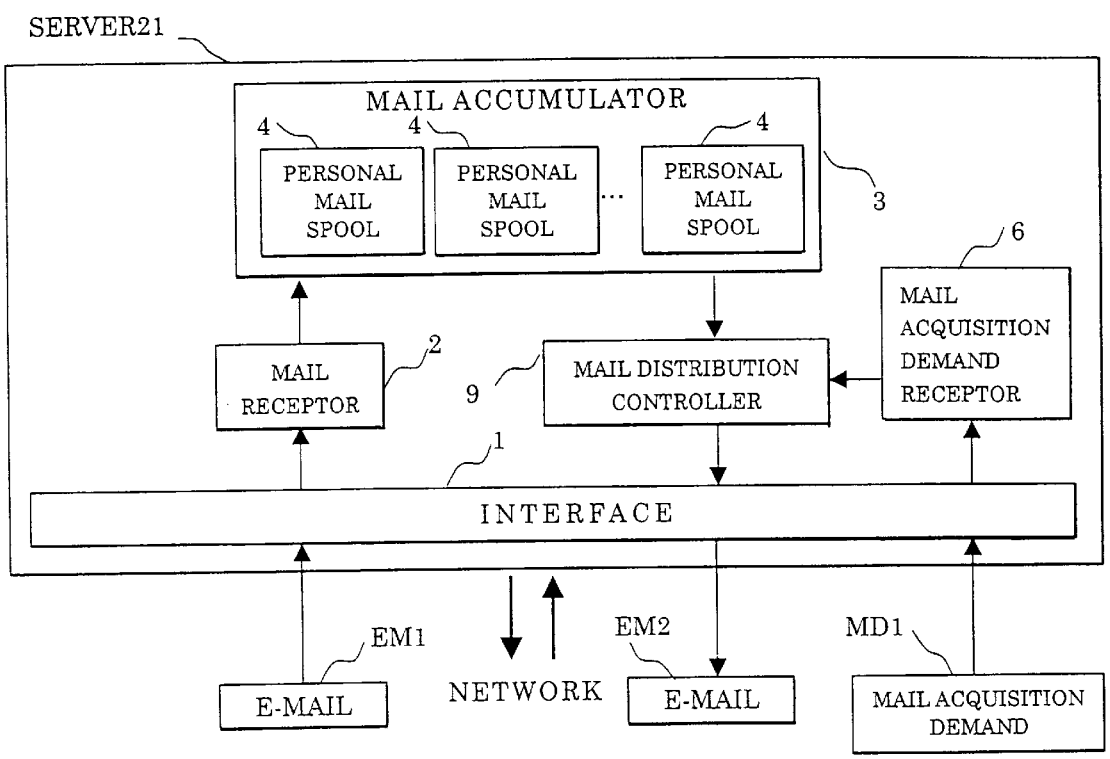
FIG. 19 is a block diagram showing a system arrangement of a server in a conventional E-mail distribution system.
Figure 20:
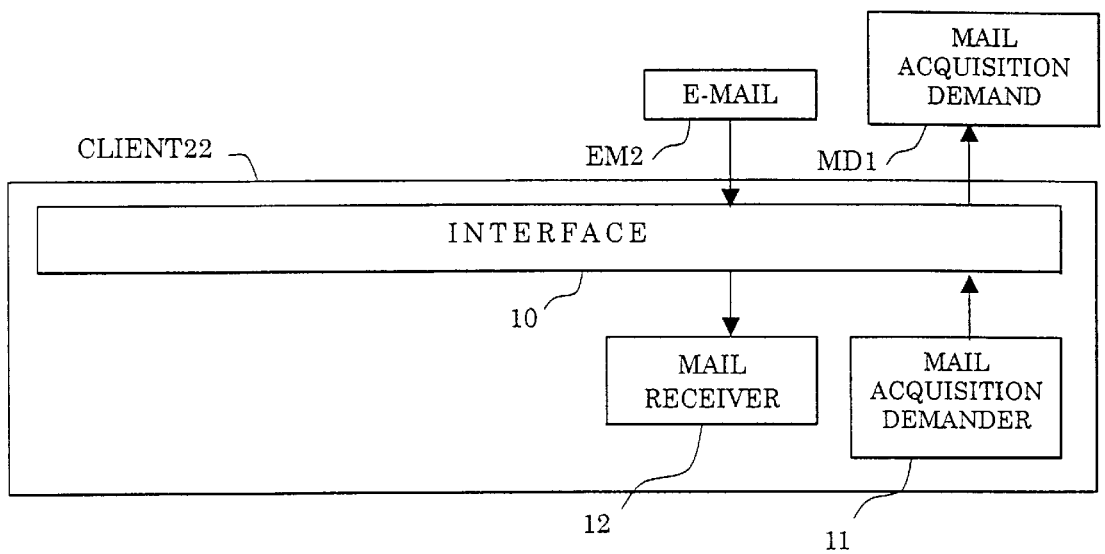
FIG. 20 is a block diagram showing a system arrangement of a client in a conventional E-mail distribution system.
Figure 21:
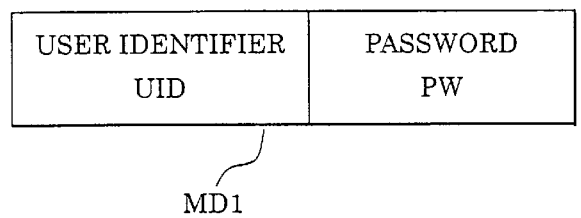
FIG. 21 is a block diagram showing a format example of a mail acquisition demand used in a conventional E-mail distribution system.

First of all, an E-mail is prepared having a format such as the question mail shown in FIG. 16 in accordance with the input form shown in FIG. 15. Namely, when necessary articles are given to the input form of FIG. 15, the question mail is transformed into the E-mail EM1 of the format shown in FIG. 16 and will be transmitted to the server 21.

When an E-mail EM1 has been transmitted to the server 21, the mail receptor 2 accepts the E-mail EM1 through the interface 1 (at step S1 in FIG. 5), and analyzes the arrival address (at step S2). If it is an individual mail address, the E-mail EM1 is accumulated in one of the personal mail spools 4 corresponding to the arrival address in the mail accumulator 3 (at step S3).

If the arrival address is a group E-mail address GMA, the E-mail EM1 is accumulated in the group mail spools 5. In this case, the E-mail distribution method with respect to the group mail address GMA is analyzed. If it is found that "Group E-mail distribution" is designated, the E-mail EM1 is accumulated in one of the group mail spools 5 corresponding to the group mail address GMA (at step S5).

Figure 22:
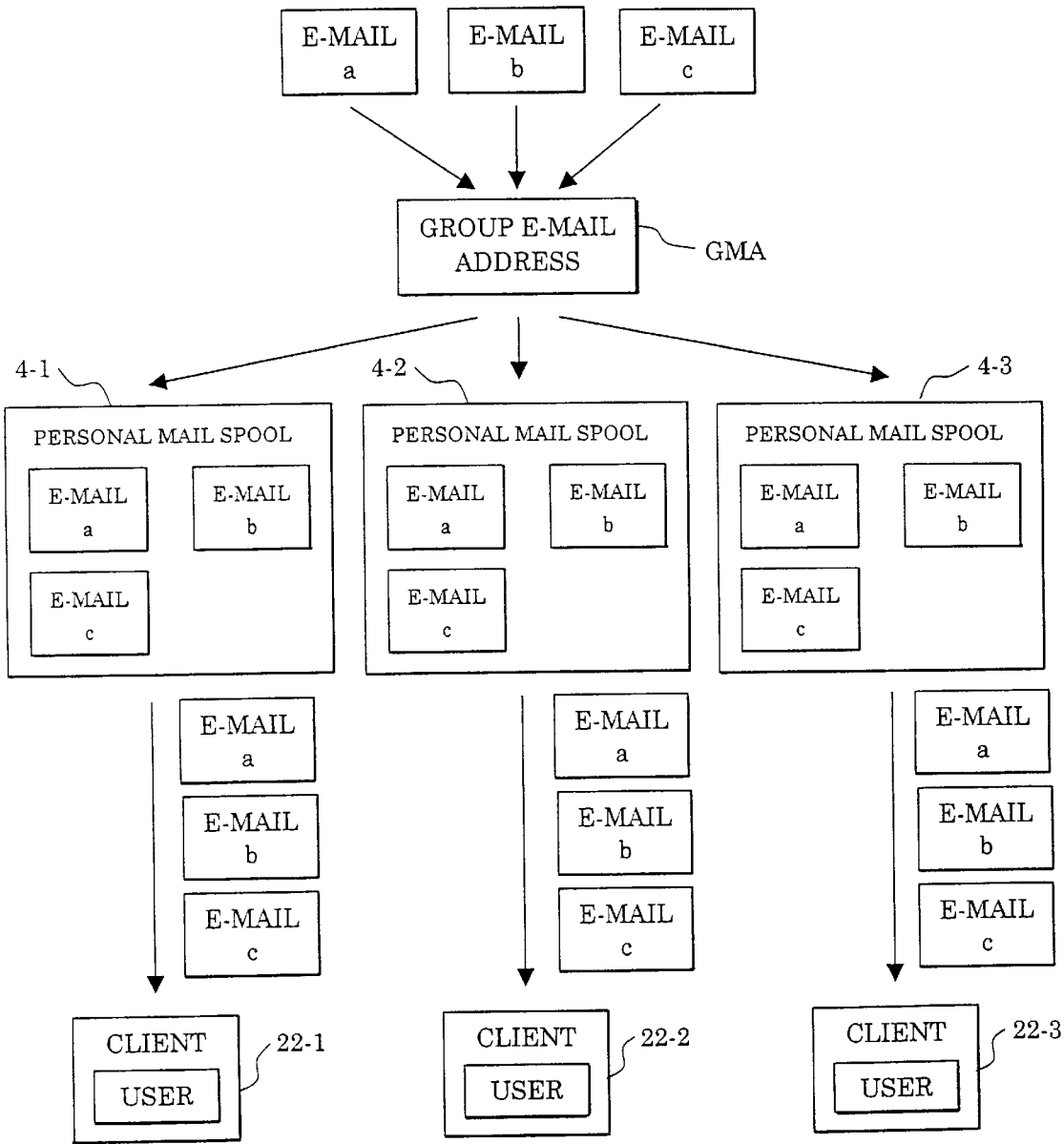
FIG. 22 is a block diagram showing a concept of a broadcasting distribution method in a conventional E-mail distribution system.

When the group mail address GMA designates "Broadcasting distribution method" shown in FIG. 22, the E-mail EM1 is accumulated in all of the personal mail spools 4 associated with the group mail address GMA (at step S6).

Figure 23:
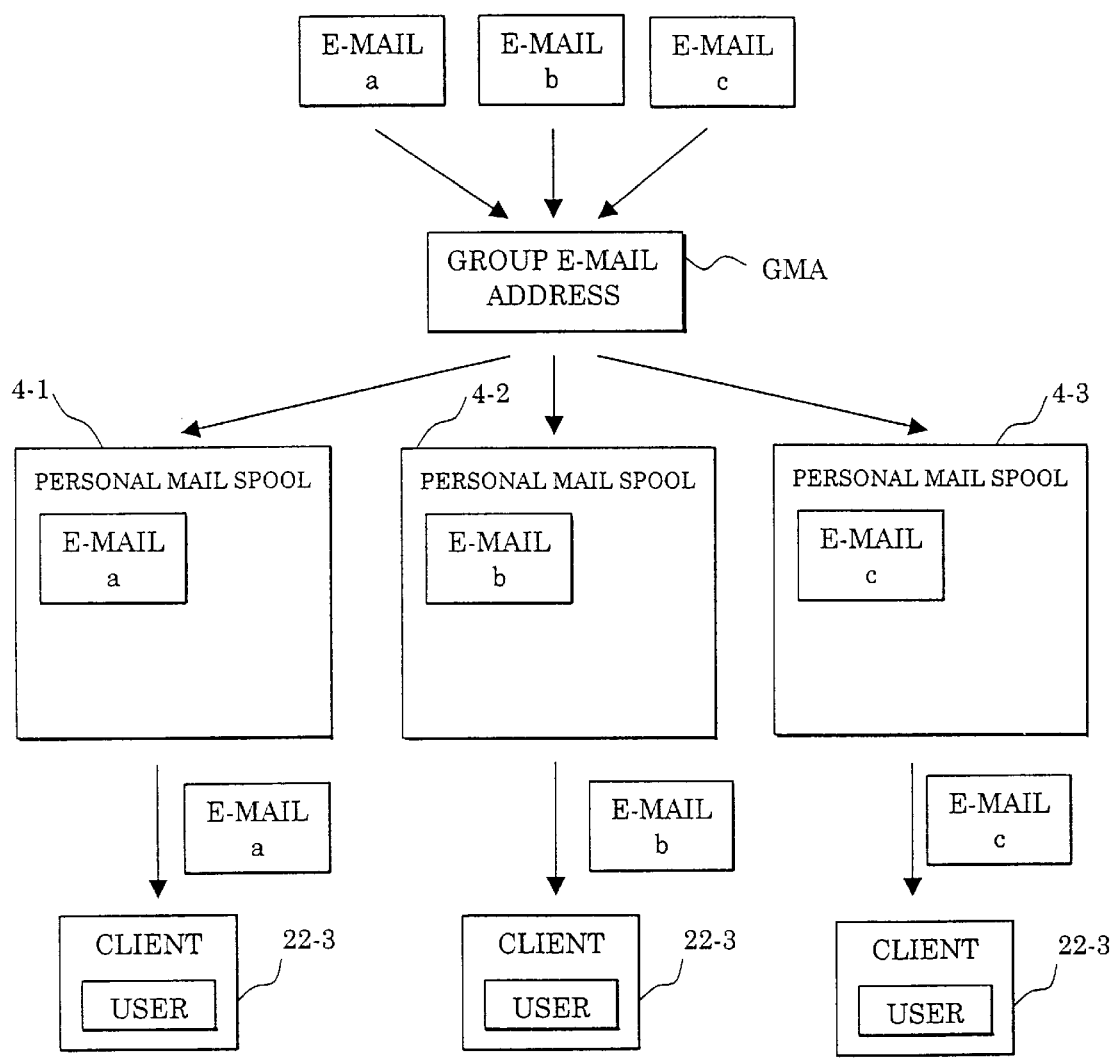
FIG. 23 is a block diagram showing a concept of a transferring distribution method in a conventional E-mail distribution system.

In addition, when the group mail address GMA designates "transferring distribution method" shown in FIG. 23, the E-mail EM1 is accumulated in one of the personal mail spools 4 associated with the group mail address GMA (at step S7).

Figure 6:
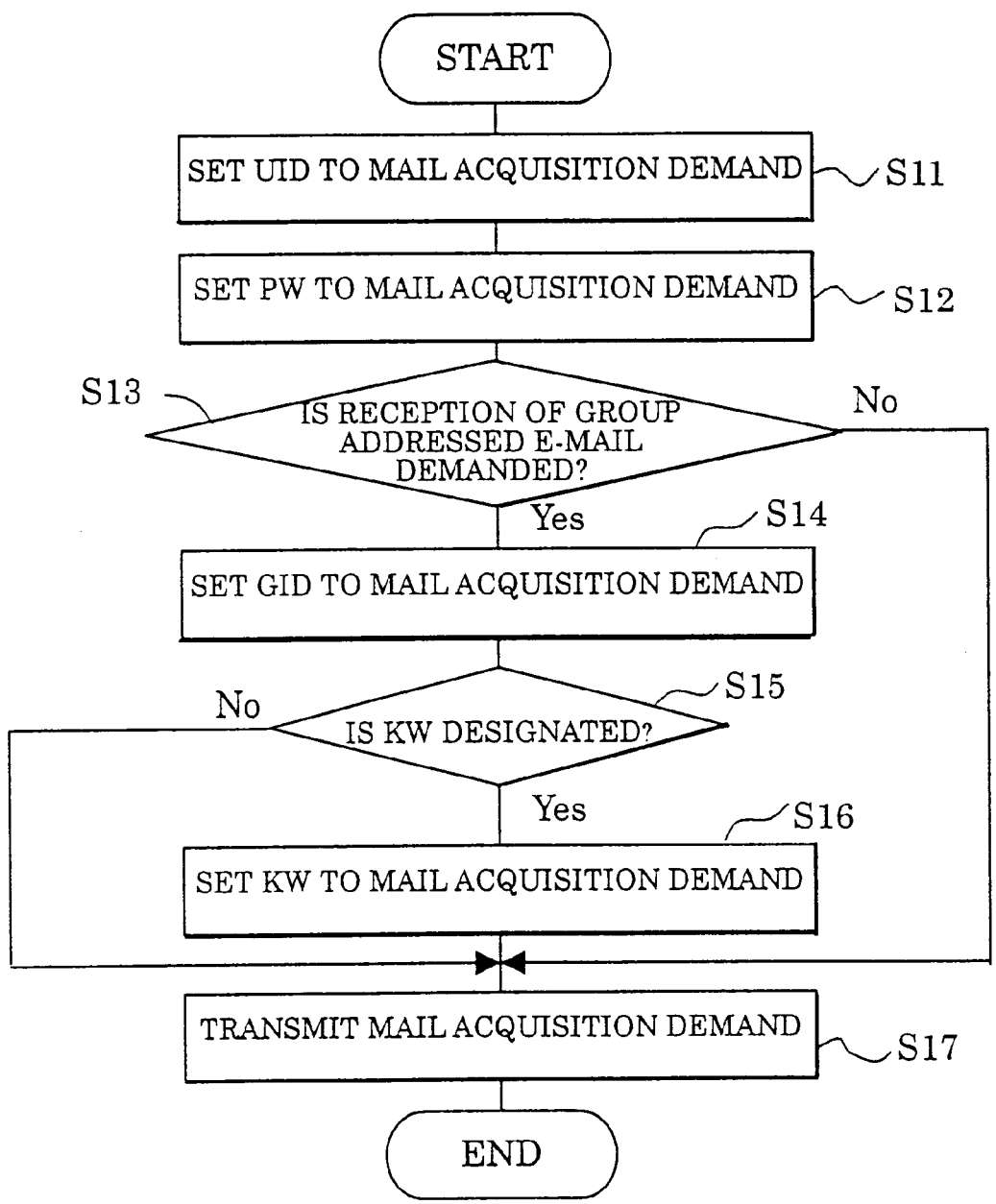
FIG. 6 is a flow chart showing an operation procedure of a mail acquisition demander used in a client in an E-mail distribution system according to the present invention.

Operation of the Mail Acquisition Demander 11 (see FIG. 6)

The mail acquisition demander 11 of the client 22 sets a user identifier UID and a password PW in the mail acquisition demand MD1 (at step S11, S12). In addition, when the reception of E-mails addressed to a group is demanded, the group identifier GID is set in the mail acquisition demand MD1 (at step S13, S14). Moreover, when the reception of E-mails which include a certain key word KW is demanded, the key word KW is set in the mail acquisition demand MD1 (at step S15, S16), and the mail acquisition demand MD1 is transmitted to the server (at step S17).

Figure 7:
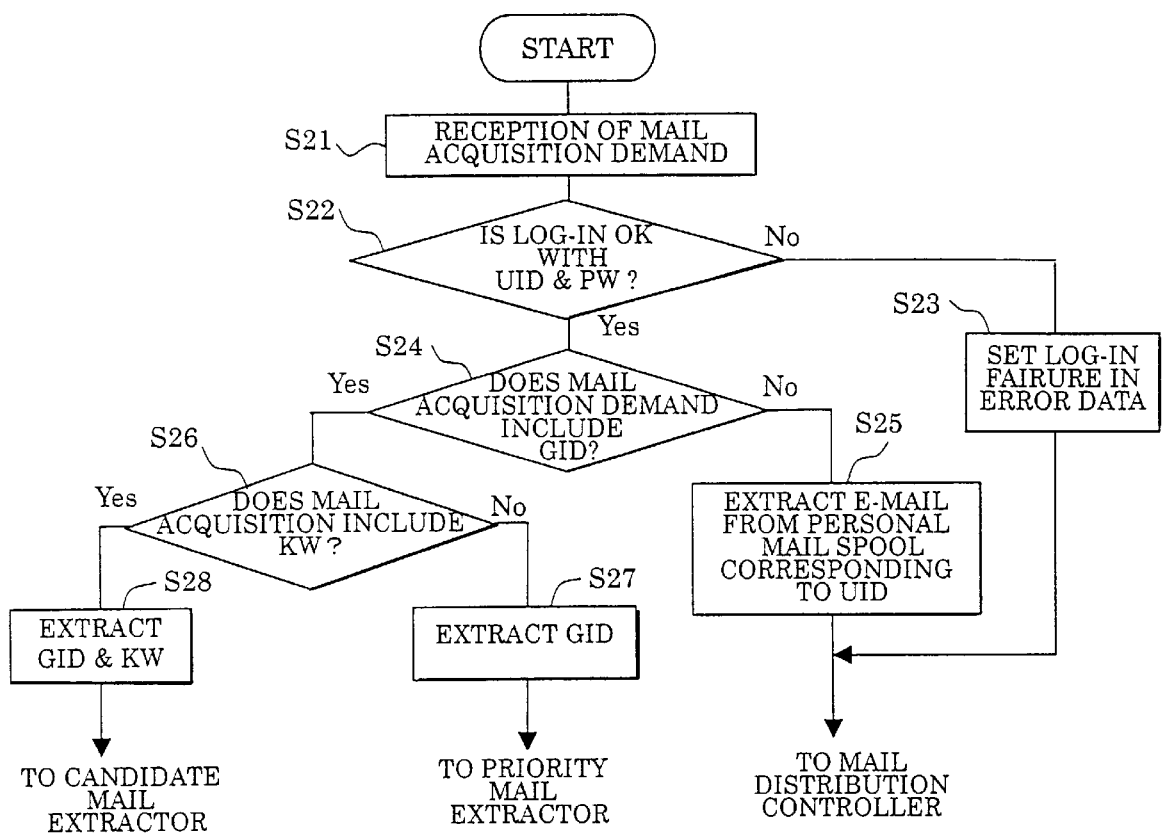
FIG. 7 is a flow chart showing an operation procedure of a mail acquisition demand receptor used in a server in an E-mail distribution system according to the present invention.

Operation of the Mail Acquisition Demand Receptor 6 (see FIG. 7)

The mail acquisition demand receptor 6 in the server 21 receives the mail acquisition demand MD1 (at step S21) and specifies the user by executing the log-in process using the user identifier UID and the password PW (at step S22). When the log-in process is failed, the log in failure is set in the data which is returned back to the client 22 (at step S23) so that the mail distribution controller 9 may execute the process.

When the log-in process is successful and the group identifier GID is not set in the mail acquisition demand MD1, an E-mail is extracted from the personal mail spools 4 corresponding to the user identifier UID (at step S24, S25), and then the control is taken over by the mail distribution controller 9. Moreover, only when being set, the group identifier GID is extracted (at step S24, S26, S27), and then the process is taken over by the priority mail extractor 8.

When both of the group identifier GID and the key word KW are set, the group identifier GID and the key word KW are extracted (at step S24, S26, S28), and then the process is taken over by the candidate mail extractor 7.

Figure 8:
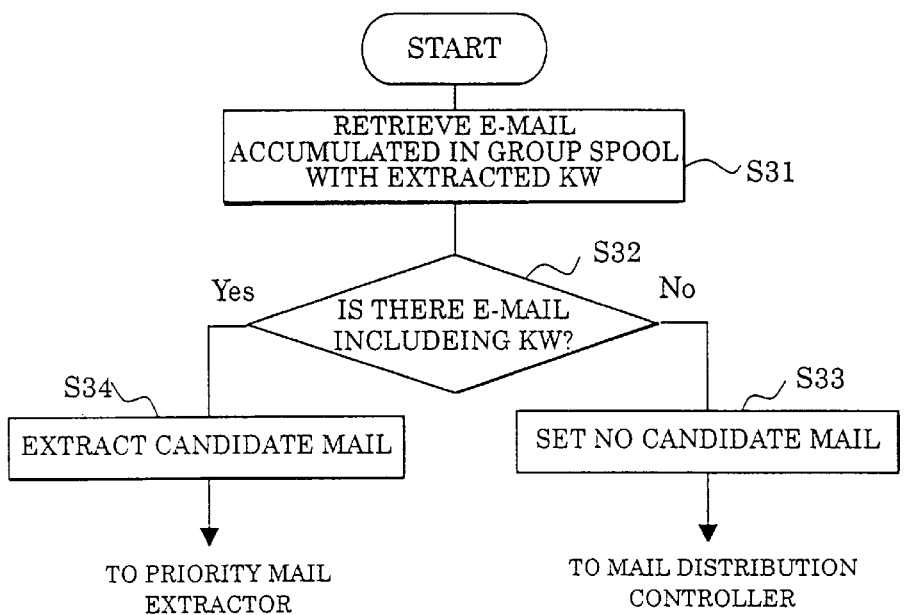
FIG. 8 is a flow chart showing an operation procedure of a candidate mail extractor used in a server in an E-mail distribution system according to the present invention.

Operation of the Candidate Mail Extractor 7 (see FIG. 8)

According to group identifier GID and the key word KW extracted by the mail acquisition demand receptor 6. The candidate mail extractor 7 in the server 21 retrieves the E-mails accumulated in the group E-mail spools 5 corresponding to the group identifier GID by using the key word KW (at step S31).

If there is no E-mail which includes the key word KW, "no candidate mail" is set in the data which is returned back to the client 22 (at step S33), and then the process is taken over by the mail distribution controller 9. Moreover, if there is an E-mail which includes the key word KW, the E-mail EM2 including the key word KW is extracted (at step S34), and then the process is taken over by the priority mail extractor 8.

Figure 9:
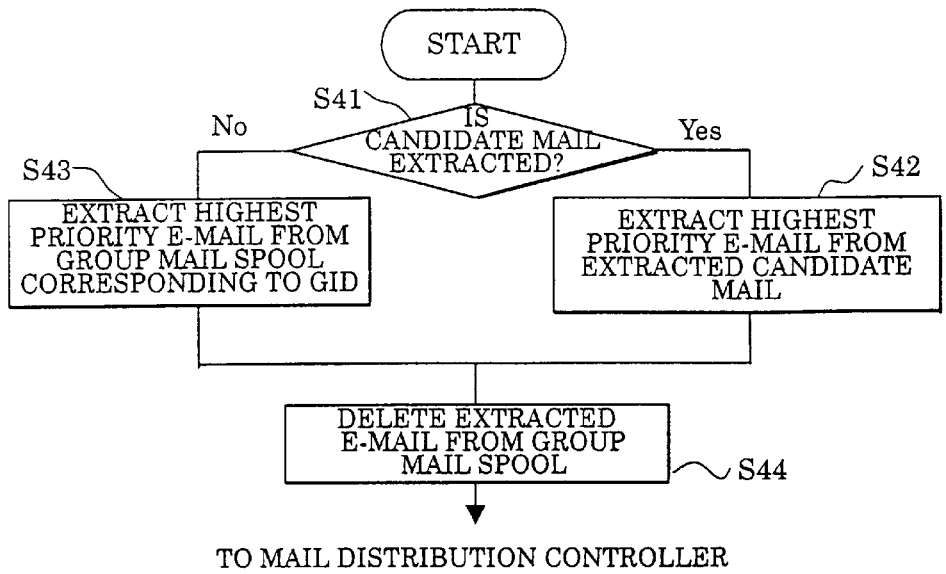
FIG. 9 is a flow chart showing an operation procedure of a priority mail extractor used in a server in an E-mail distribution system according to the present invention.

Operation of the Priority Mail Extractor 8 (see FIG. 9)

When the candidate mail is extracted, the priority mail extractor 8 in the server 21 extracts an E-mail with the first priority from the E-mails extracted by the candidate mail extractor 7(at step S41, S42). Moreover, when the candidate mail is not extracted, an E-mail EM2 with the first priority is extracted from the group E-mail spools 5 corresponding to the group identifier GID (at step S41, S43). In any case, the extracted E-mail EM2 is deleted from the group mail spools 5 (at step S44), and then the process is taken over by the mail distribution controller 9.

Figure 10:
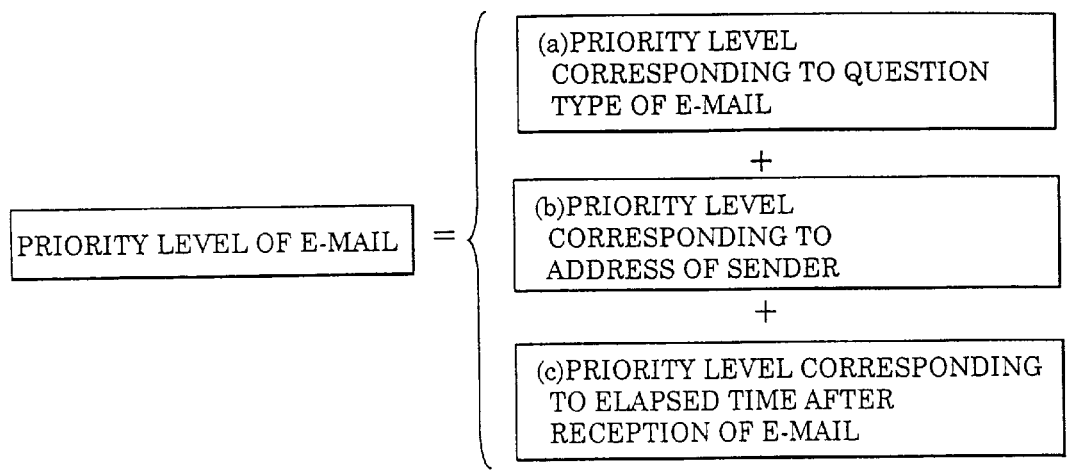
FIG. 10 is a diagram showing a calculation procedure of a priority level of an E-mail extracted by a priority mail extractor in an E-mail distribution system according to the present invention.

The process by which the priority level of an E-mail is calculated in the priority mail extractor 8 will now be described referring to FIGS. 11–13. FIG. 10 illustrates a calculation chart of an E-mail priority level, FIG. 11 a chart of the priority level data corresponding to a question type, FIG. 12 a chart of the priority level data corresponding to a sender, and FIG. 13 illustrates a chart of the priority level data corresponding to an elapsed time, respectively.

The priority mail extractor 8 extracts the question type included in the contents of an E-mail, and a priority level (a) (see FIG. 10) which is consistent with the question type of the priority level data corresponding to the question type (see FIG. 11). When there is no consistent question type, the priority level (a) is assumed to be "0". Next, the sender address of the E-mail is extracted, and a priority level (b) (see FIG. 10) which is consistent with the sender address of the priority level data corresponding to the sender address (see FIG. 12) is extracted. When there is no consistent sender address, the priority level (a) is assumed to be "0".

Next, an elapsed time after the E-mail was received is calculated, and a priority level (c) (see FIG. 10) corresponding to the elapsed time of the priority level data is extracted (see FIG. 13). Finally, the priority levels (a), (b), and (c) are added to assume the priority level of the E-mail (see FIG. 10).

Figure 14:
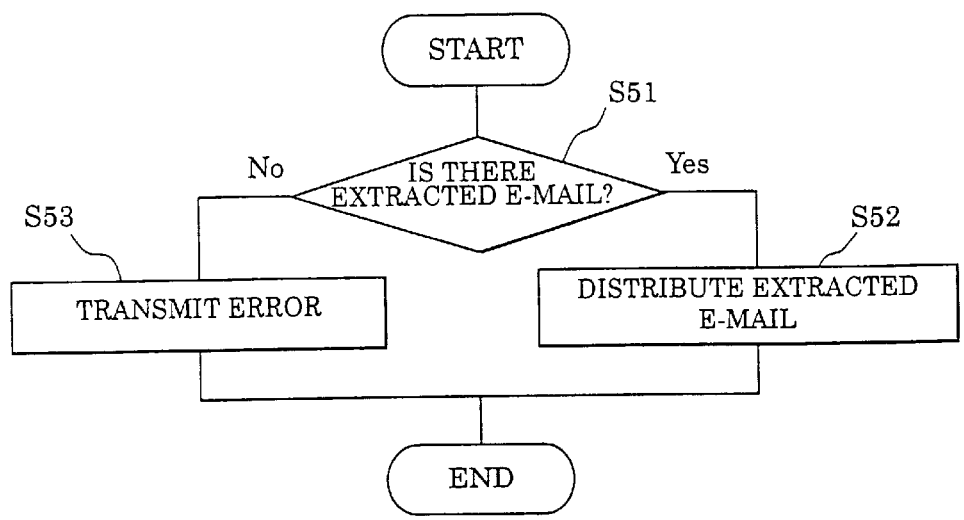
FIG. 14 is a flow chart showing an operation procedure of a mail distribution controller used in a server in an E-mail distribution system according to the present invention.

Operation of the Mail Distribution Controller 9 (see FIG. 14)

When no extracted E-mail exists and the error is set, the mail distribution controller 9 in the server 21 transmits error data of "no receiving mail" to the client 22 (at step S51, S53). When the extracted E-mail exists, the E-mail EM2 is transmitted to the client 22 (at step S51, S52). As a result, the mail receiver 11 in the client 22 receives the E-mail sent from the server 21 or the error data.

As described above, the E-mail distribution system according to the present invention is arranged so that a client transmits a mail acquisition demand which includes an identifier of a group, a server includes personal mail spools and group mail spools which accumulate a received E-mail corresponding to an arrival address, and if the mail acquisition demand from the client includes the identifier of the group, an E-mail with top priority is extracted from the group mail spools corresponding to the group identifier and is then distributed to the client. Therefore, it becomes possible to distribute an E-mail transmitted with respect to the E-mail address corresponding to the group to only one of the clients (users) within the group with top priority.

When a question or the like is received with an E-mail toward the E-mail address corresponding to the group and one of the clients/users within the group answers the question, an efficient operation can be executed as follows:

1̂ A question mail is distributed to only one answerer within the group. Therefore it is possible to prevent waste E-mails from being distributed to the other answerers within the same group.

2̂ The situation is excluded that the user leaves an E-mail without checking it, while the E-mail has been distributed to a personal mail spool so that the answer to the questioner is delayed whereby the response to the question can be improved.

3̂ By distinguishing the questioners, the response to the questioner with a higher priority such as VIP can be improved.

4̂ By distinguishing the contents of the questions, the response can be improved for a question with a higher emergency degree.

What we claim is:

1. A server which distributes an E-mail corresponding to a group including a plurality of clients, comprising:
    a mail accumulator which includes personal mail spools for arrival personal mail addresses, and group mail spools for arrival group mail addresses,
    a mail receptor which accumulates a received E-mail in the mail spools corresponding to the arrival mail addresses,
    a mail acquisition demand receptor which extracts a group identifier included in the mail acquisition demand received from the clients,
    a priority mail extractor which extracts an E-mail with top priority from the group mail spools corresponding to the group identifier, and
    a mail distribution controller which distributes the extracted E-mail to the clients.

2. The server as claimed in claim 1, further comprising a candidate mail extractor, and when the mail acquisition demander inserts a key word into the mail acquisition demand the mail acquisition demander extracting the group identifier and the key word and the candidate mail extractor retrieving an E-mail accumulated in the group mail spools corresponding to the group identifier based on the extracted key word and extracting the retrieved E-mail as a candidate mail, and the priority mail extractor extracting an E-mail with top priority based on the contents of each E-mail from the candidate E-mails.

3. The server as claimed in claim 1 wherein the mail receptor accumulates the received E-mail in the group mail spools corresponding to the group mail address.

4. The server as claimed in claim 1 wherein the mail receptor accumulates the received E-mail in all of the personal mail spool associated with the group mail address corresponding to the arrival address.

5. The server as claimed in claim 1 wherein the mail receptor accumulates the received E-mail in one of the personal mail spools associated with the group mail address corresponding to the arrival address.

6. The server as claimed in claim 1 wherein when the arrival address is a personal mail address, the mail receptor accumulates the E-mail in the personal mail spool corresponding to the personal mail address.

7. The server as claimed in claim 1 wherein the priority mail extractor determines a priority in consideration of an emergency degree of the contents of the E-mail, sender address information, and an elapsed time after the E-mail has been accumulated in the mail spool.

8. The server as claimed in claim 2 wherein the priority mail extractor determines a priority in consideration of an emergency degree of the contents of the E-mail, sender address information, and an elapsed time after the E-mail has been accumulated in the main spool.

9. The server as claimed in claim 7 wherein the emergency degree of the contents of the E-mail is a question type.

10. The server as claims in claim 8 wherein the emergency degree of the contents of the E-mail is a question type.

11. The server as claimed in claim 1 wherein the clients comprise a mail acquisition demander which executes a log-in process with a user identifier and a password included in the mail acquisition demand from the clients.

12. The server as claimed in claim 2 wherein the clients comprise a mail acquisition demander which executes a log-in process with a user identifier and a password included in the mail acquisition demand from the clients.

13. The server as claimed in claim 11 wherein the mail acquisition demand receptor extracts an E-mail from the personal mail spools corresponding to the user identifier when the mail acquisition demand from the client does not contain the group identifier.

14. The server as claimed in claim 12 wherein the mail acquisition demand receptor extracts an E-mail from the personal mail spools corresponding to the user identifier when the mail acquisition demand from the client does not contain the group identifier.

* * * * *